United States Patent
den Hartog et al.

(10) Patent No.: US 9,203,970 B2
(45) Date of Patent: Dec. 1, 2015

(54) METHOD AND SYSTEM FOR RETRIEVING NETWORK ADDRESSES IN HYBRID TELECOMMUNICATION NETWORK

(75) Inventors: Jos den Hartog, Capelle a/d ljssel (NL); Rakesh Taori, Suwon (KR); Ulf Olsson, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 943 days.

(21) Appl. No.: 11/572,984

(22) PCT Filed: Jul. 19, 2005

(86) PCT No.: PCT/EP2005/007834
§ 371 (c)(1),
(2), (4) Date: Apr. 23, 2007

(87) PCT Pub. No.: WO2006/010525
PCT Pub. Date: Feb. 2, 2006

(65) Prior Publication Data
US 2008/0064385 A1    Mar. 13, 2008

Related U.S. Application Data

(60) Provisional application No. 60/592,427, filed on Jul. 30, 2004.

(51) Int. Cl.
*H04L 12/66* (2006.01)
*H04M 7/00* (2006.01)
(Continued)

(52) U.S. Cl.
CPC ....... *H04M 7/0027* (2013.01); *H04L 29/12009* (2013.01); *H04L 29/12047* (2013.01);
(Continued)

(58) Field of Classification Search
CPC .............. H04L 29/1216; H04L 61/157; H04L 29/12018; H04L 61/10; H04L 29/12009; H04L 61/15; H04L 29/12047; H04L 65/1006; H04L 65/1016; H04M 7/0027; H04W 4/14; H04W 88/06

USPC .................. 370/352–356; 455/414.2, 415
See application file for complete search history.

(56) References Cited

U.S. PATENT DOCUMENTS 5,949,763 A    9/1999    Lund et al.
6,389,119 B1 *  5/2002    McBride ................ 379/93.01
(Continued)

FOREIGN PATENT DOCUMENTS

| JP | H10-155034 A | 6/1998 |
| JP | 2000-270024 A | 9/2000 |
| JP | 2003-260011 A | 9/2003 |
| JP | 2004-165949 A | 6/2004 |

OTHER PUBLICATIONS

3GPP TS 23.090 V5.0.0; 3rd Generation Partnership Project; Technical Specification Group Core Network; Unstructured Supplementary Service Data (USSD)—Stage 2 (Release2); Jun. 2002.
3GPP TS 22.030 V7.0.0; 3rd Generation Partnership Project; Technical Specification Group Services and System Aspects; Man-Machine Interface (MMI) of the User Equipment (UE) (Release 5); Mar. 2004.
3GPP TS 23.038 V5.0.0; 3rd Generation Partnership Project; Technical Specification Group Terminals; Alphabets and language-specific information (Release 5); Mar. 2002.
(Continued)

*Primary Examiner* — Hoang-Chuong Vu

(57) ABSTRACT

Combinational networks may provide simultaneous connectivity over networks of different type between User Equipment of an A-party and B-party. A communication session, comprising a circuit switched call and one or more packet switched sessions, may be deployed simultaneously over different network types, in relation to the same User Equipment. The circuit switched call and the packet switched session may be correlated. As to retrieve the packet switched address of a circuit switched call partner, a retrieval for a packet switched network address is initialized by means of a circuit switched protocol over a circuit switched network. The address retrieval request is directed to the call partner or a network node that accomplishes the network address request.

12 Claims, 1 Drawing Sheet

(51) Int. Cl.
*H04L 29/12* (2006.01)
*H04L 29/06* (2006.01)
*H04W 4/14* (2009.01)
*H04W 88/06* (2009.01)

(52) U.S. Cl.
CPC ............ *H04L61/15* (2013.01); *H04L 65/1006* (2013.01); *H04L 65/1016* (2013.01); *H04W 4/14* (2013.01); *H04W 88/06* (2013.01)

(56) References Cited

U.S. PATENT DOCUMENTS

| | | | |
|---|---|---|---|
| 6,584,094 B2 * | 6/2003 | Maroulis et al. | 370/352 |
| 6,603,758 B1 * | 8/2003 | Schmuelling et al. | 370/352 |
| 6,683,871 B1 * | 1/2004 | Lee et al. | 370/356 |
| 6,757,266 B1 * | 6/2004 | Hundscheidt | 370/328 |
| 6,819,663 B2 * | 11/2004 | Komuro | 370/352 |
| 6,907,034 B1 * | 6/2005 | Begis | 370/354 |
| 7,027,433 B2 | 4/2006 | Tuohino et al. | 370/352 |
| 7,092,380 B1 | 8/2006 | Chen et al. | 370/352 |
| 7,251,317 B1 * | 7/2007 | Robbins et al. | 379/114.21 |
| 2001/0055379 A1 * | 12/2001 | Mamiya et al. | 379/201.05 |
| 2002/0021696 A1 | 2/2002 | Minborg | |
| 2003/0007482 A1 * | 1/2003 | Khello et al. | 370/352 |
| 2003/0023748 A1 * | 1/2003 | Takemoto et al. | 709/238 |
| 2003/0026394 A1 | 2/2003 | Chapman et al. | |
| 2003/0081754 A1 * | 5/2003 | Esparza et al. | 379/221.01 |
| 2003/0123437 A1 * | 7/2003 | Nevalainen | 370/356 |
| 2003/0135586 A1 * | 7/2003 | Minborg et al. | 709/219 |
| 2003/0142654 A1 * | 7/2003 | Chambers et al. | 370/338 |
| 2003/0172173 A1 * | 9/2003 | Fenton | 709/231 |
| 2004/0028030 A1 * | 2/2004 | Lai et al. | 370/352 |
| 2004/0054810 A1 * | 3/2004 | Furukawa et al. | 709/249 |
| 2004/0067761 A1 * | 4/2004 | Pyhalammi et al. | 455/466 |
| 2004/0122896 A1 * | 6/2004 | Gourraud | 709/204 |
| 2004/0180621 A1 * | 9/2004 | Fowler | 455/39 |
| 2004/0184439 A1 * | 9/2004 | Blanc et al. | 370/349 |
| 2004/0205170 A1 * | 10/2004 | Minborg et al. | 709/220 |
| 2004/0240441 A1 | 12/2004 | Sriram | 370/389 |
| 2004/0252674 A1 * | 12/2004 | Soininen et al. | 370/352 |
| 2005/0059389 A1 * | 3/2005 | Minko | 455/423 |
| 2005/0107100 A1 * | 5/2005 | Gustafsson et al. | 455/466 |
| 2005/0265322 A1 * | 12/2005 | Hester | 370/352 |
| 2006/0039356 A1 * | 2/2006 | Rao et al. | 370/352 |
| 2006/0098621 A1 * | 5/2006 | Plata Andres et al. | 370/352 |
| 2007/0097879 A1 * | 5/2007 | Bleckert et al. | 370/254 |
| 2007/0165599 A1 * | 7/2007 | Skog et al. | 370/352 |
| 2007/0237126 A1 * | 10/2007 | Pirila et al. | 370/349 |
| 2007/0237320 A1 * | 10/2007 | Bloebaum et al. | 379/142.15 |
| 2013/0301479 A1 * | 11/2013 | White et al. | 370/259 |

OTHER PUBLICATIONS

3GPP TS 23.078 V6.1.0; 3rd Generation Partnership Project; Technical Specification Group Core Network; Customised Applications for Mobile network Enhanced Logic (CAMEL) Phase 4—Stage 2 (Release 6); Mar. 2004.

* cited by examiner

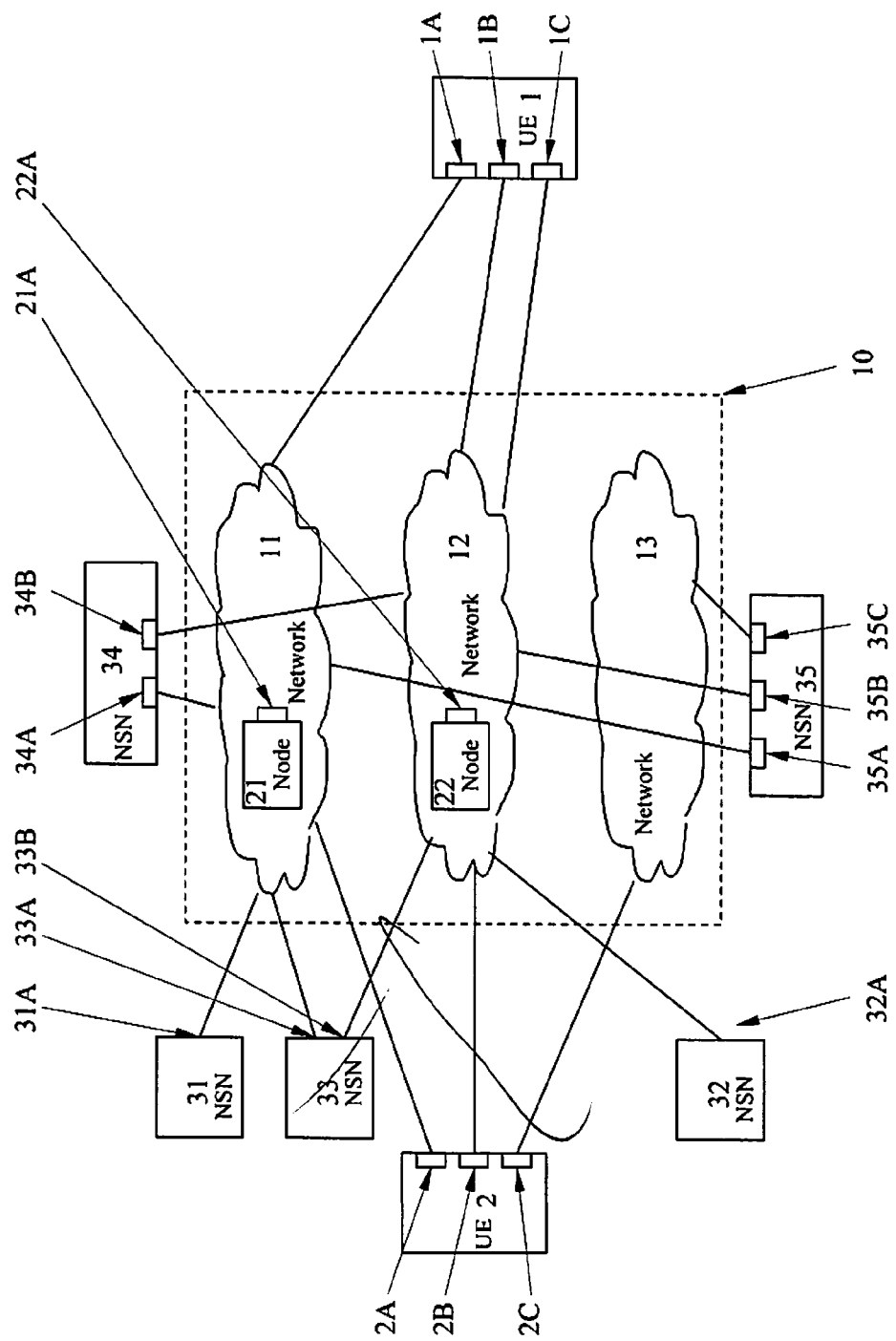

METHOD AND SYSTEM FOR RETRIEVING NETWORK ADDRESSES IN HYBRID TELECOMMUNICATION NETWORK

This application claims the benefit of U.S. Provisional Application No. 60/592,491, filed Jul. 30, 2004, the disclosure of which is fully incorporated herein by reference.

FILED OF THE INVENTION

The present invention relates generally to telecommunications systems, such as fixed, wireless or hybrid communication systems, having a packet- and circuit-switched architecture denoted as combinational networks. More particularly, the present invention facilitates a method for retrieving addressing information and terminal capabilities of User Equipment connected to the combinational network.

BACKGROUND OF THE INVENTION

Fixed- and especially mobile-networks, such as Global System for Mobile communications (GSM), General Packet Radio System (GPRS) or Universal Mobile Telecommunication System (UMTS) are constantly evolving. GSM/GPRS and UMTS networks today offer both Circuit Switched (CS) connectivity and Packet Switched (PS) connectivity. The PS end-to-end connectivity with its terminal capabilities for transmission of a wide range of data types may be used for offering multimedia services such as image, music and video transfer. The CS connectivity provides a reliable link between two User Equipment by means of one or more trusted network nodes with a reliable and defined Quality of Service (QoS).

Combinational networks, where two or more links of different type to one or more User Equipment or terminals are established, are capable to deploy both CS and PS connectivity to a User Equipment, thereby enabling services which perform their activity through PS-communication sessions, denoted as PS-sessions, and CS communication sessions, denoted as CS calls.

As to benefit from this form of service combination, User Equipment are required that are capable of handling a CS call and a PS-session simultaneously. Multi Radio Access Bearer (RAB) terminals for UMTS and Dual Transfer Mode (DTM) terminals for GSM/GPRS networks will be available; these types of terminals provide support for simultaneous CS- and PS-connectivity.

Today, conversational voice cannot be delivered over PS bearers to the end user, due to insufficient capacity in the Radio Access Networks in operation and therefore existing CS bearers are used for delivering conversational voice. In the future, it may be possible that a single PS bearer is used for conversational voice and multimedia. Nevertheless, DTM terminals today-, and UMTS terminals in the future, will deliver support for simultaneous CS- and PS-connectivity.

Using the simultaneous connectivity, a party denoted here as A-party browses Internet (establish a PS-session) while talking to another party, denoted here as B-party, via a voice-call via a CS network. Simultaneity, however, does not necessarily imply that the ongoing CS-call is related to the ongoing PS-session.

In contrast to this when the A-party, which has an ongoing CS-call with the B-party, sends a picture showing how beautiful the snow outside the house looks, while talking about the weather, the picture transferred in a PS-session and the ongoing CS-call are related from the A-party's perspective. The PS-session, though, can be established in such a way that it is functionally identical to an uncorrelated web-browsing session.

Suppose that said A-party calls, by means of a CS-call, the B-party by using B-party's name from an address book, related to the CS-network. When the A-party needs to post a picture to the B-party, while talking to the B-party, the A-party has to browse through his/her "PS address book" to transfer the picture. A PS-session is established with the B-party, completely independent of the ongoing CS-call. In this example, there is no interaction between the user interfaces, or the network components—the correlation takes place in the users' head.

In the foregoing example, it would be desirable if the A-party had the possibility to send the picture to the B-party—the B-Party from the CS address book. The A-party should have a possibility to choose: "Send the picture to my CS-call partner" such that the A-party is relieved from having to browse any address book.

When a service residing in the network, and/or client software in the terminal or User Equipment becomes aware (or is made aware) of the relation between the CS-call and the PS-session, the CS-call and PS-session become correlated from that service' viewpoint, and a service thus provided is referred to as a combinational service. An important issue in the combinational service, in particular in the foregoing example, is addressing, i.e. "How to get the address of the PS-domain part of the B-party's phone, terminal or User Equipment?" Another issue is, when the A-party sends a picture to the B-party, he/she would also like the picture to actually arrive on B-party's terminal or User Equipment. Additionally the A-party should know that the B-party has a terminal or User Equipment that is actually capable of receiving A-party's PS-session based message. I.e. how does the A-party get to know about the B-party's terminal capabilities?

In order to give the A-party the best possible user experience, it should be possible for certain icons to light up (or even appear) on the Graphical User Interface (GUI) of the A-party's terminal that inform him/her about the availability of various possibilities to communicate with the B-party. For instance, if the B-party has a DTM terminal, a "picture messaging" icon should light up on A-party's terminal User Equipment.

The problem to be solved is: (1) how can the A-party get the PS-session addressing information of the B-party and the PS-session terminal capabilities of the B-party's terminal or User Equipment (the terminal of the "CS-call partner"), when a CS-call is established or after a CS-call has been established between the A-party and the B-party, and (2) how can the B-party get the PS-session addressing information of the A-party and the PS-session terminal capabilities of the A-party's terminal or User Equipment?

Prior art solutions to the problem posed are provided by patent application US 2003/0026394 A1 [Chapman et al.] and U.S. Pat. No. 5,949,763 [Lund].

Chapman et al. discloses a system and method for establishing a voice and related data connection over disparate networks, wherein a voice connection telephone number determines an associated data destination by means of a query to a network database i.e. a local database, or a hybrid number register for said data destination. This, performed by a network node or Mobile Switching Centre, and provides the destination, such as an IP-address, to a Packet control Unit.

Lund describes a system and method for establishing a voice and data connection from a terminal connected to a central office by means of a loop pairs or DSL connection, carrying both voice and data, towards a subscriber, via a PSTN and data network, where an SCP queries a network database, as to check the configuration of the calling and called party's terminals and retrieves the IP data addresses, and sends the data addresses towards the Customer Premise Equipment (CPE) terminals for establishing a data-connection.

SUMMARY OF THE INVENTION

It is an object of the present invention to provide a method of retrieving a PS-domain based network address and PS-domain terminal capabilities of a User Equipment of a CS-call partner in a combinational telecommunication network comprising networks of different type being a CS-network and at least one PS-network, where a CS-call has been established and the CS-call and a to be established PS-session are correlated.

It is a further object of the present invention to provide a User Equipment, implemented as one or more devices, each having a connection to the CS-network and to one or more PS-networks by means of a network connection, which User Equipment is arranged for performing said address and capability retrieval according to the presented method.

The object is achieved by the present invention by means of a method executed by the User Equipment where the PS-network address is retrieved of the CS-call partner's User Equipment, within a telecommunication system comprising the CS-network and the one or more PS-networks, and where the User Equipment are both connected to the same CS- and PS networks, each connection associated with a network address. The PS-network address of the CS-call partner's User Equipment is requested/retrieved via the CS-network or via the PS-network to/from the CS-call partner's User Equipment.

The request is received by the CS-call partner's User Equipment and the PS-network address is looked up and sent back to the requesting User Equipment. Alternatively a network service is requested for the PS-network address of the CS-call partner's User Equipment.

In order to reach the B-party in a PS-domain, the B-party must be registered in the PS-domain. In the presented solution different levels of addressing are involved. To reach the B-party's User Equipment at the Internet Protocol (IP) layer, the IP address of the B-party is needed. To set up a Session Initiation Protocol (SIP) session with B-party's User Equipment, the SIP secure (SIPs, Internet Engineering Task Force, RFC 3261 ch.19.1] Unified Resource Identifier (URI) is needed. For a SIP service, for example presence, a service identifier, the presence URI, is needed. In the present document, these different identifiers are collectively referred to as PS-domain identifiers. Registrations may be needed at each level.

The invention provides a solution to the problem of retrieving the PS-domain identifiers such as the PS-network addresses and the UE's terminal capabilities by having the A-party User Equipment query a network service or B-party's User Equipment for the desired network address and terminal capabilities of the B-party's User Equipment. The invention deploys either of two queries:

User Equipment initiated Query using a CS-domain method

User Equipment initiated Query using a PS-domain method

At the CS-domain method, the A-party User Equipment deploys CS-domain methods via the CS network, in particular an Unstructured Supplementary Service Data mechanism [USSD, 3rd. Generation Partnership Project (3GPP) TS 23.090] as to query a service in the network, or the peer terminal or User Equipment, to retrieve the address(es) of the B-party.

In the PS-domain method, the terminal uses PS-domain methods via the PS-network, for example the sending of SIP messages, towards an entity in the network (e.g. a presence server) to retrieve the address(es) of the B-party.

Once the relevant PS-domain identifier (e.g. the PS-domain network address) of the B-party is retrieved, the B-party can be contacted directly via the PS-network as to exchange UE terminal capabilities.

As it is possible to address the B-party's User Equipment at different layers, it is beneficial for a network operator to use SIP URI signalling for this purpose, since SIP URI signalling enables controlling or influencing exchange of terminal capability parameters. When using the SIP URI, the SIP OPTIONS method is used to exchange terminal capabilities.

These and other embodiments according to the present invention are now illustrated in more detail with reference to the enclosed drawings.

BRIEF DESCRIPTION OF THE DRAWINGS

FIG. 1 presents a schematic diagram of a combinational network with User Equipment and network nodes connected to the combinational network.

DETAILED DESCRIPTION

Without restrictions to the scope of the invention, in order to provide a thorough understanding of the present invention, the invention is presented against the background and within the scope of a current GSM/UMTS implementation of mobile communication system deployed in a combinational network environment. However, the present invention may be deployed in any communication system comprising combinational networks.

FIG. 1 illustrates schematically a combinational network 10 comprising several networks of different network type 11, 12, 13, with a first User Equipment (UE) 1 and a second UE 2 connected to all or at least two of the networks 11, 12, 13. As to provide physical connection to the networks 11, 12, 13, the UE 1, 2 has network interfaces 1A, 1B, 1C, 2A, 2B, 2C, each associated with a network address, towards said networks 11, 12, 13.

For the explanation of the invention, it is arbitrarily assumed that the network 11 is a network of a CS-network type, and the networks 12 and 13 are of a PS-network type. In the present invention, it is assumed that the CS-call uses DTAP, ISUP and DSS1 as bearer. Other bearer types may be used.

The invention provides a solution to the problem of retrieving the PS-domain addresses and PS-domain terminal capabilities of a B-party's UE 1 by having the A-party's UE 2 query a B-party's UE 1 or a network service node 31, 32, 33, 34, 35 for the desired address(es) or terminal capabilities of the B-party's UE 1. The solution uses either one of the following two different types of queries:

a) UE 1, 2 initiated query using a CS-domain method,
b) UE 1, 2 initiated query using a PS-domain method.

Ad A)

At the CS-domain based address retrieval method, the A-party's UE 2 deploys CS-domain methods via the CS network, in particular an Unstructured Supplementary Service Data mechanism [USSD, 3GPP TS 23.090] as to query either a service node 31, 32, 33, 34 35 in the network or the peer UE 1, to retrieve the PS-domain address(es) of the B-party's UE 1.

The invention provides that the A-party's UE 2, being a calling party in the CS-domain, generates a terminal-initiated Unstructured Supplementary Service Data mechanism [USSD, 3GPP TS 23.090] for retrieving the PS identifier(s) of the B-party's UE 1, being the called party in the CS-domain. When having received the called party's PS identifier such as an address, the calling A-party's UE 2 queries the called B-party's UE 1 directly to obtain the UE's 1 terminal capabilities. Depending on the terminal capabilities of A-party's UE 2, the presence of appropriate terminal capabilities of the B-party's UE 1 are highlighted on a Graphical User Interface GUI of the calling A-party's UE 2. The B-party may deploy the same method to retrieve the terminal capabilities of the A-party's UE 2.

The USSD mechanism allows a user of the UE 1, 2 such as a Mobile Station, and a Public Land Mobile Network (PLMN) operator defined application to communicate in a way, which is transparent to the UE 1, 2 and to intermediate network entities.

According to 3GPP TS 23.090, which specifies the handling of USSD at the UE and network entities, a USSD mechanism is applied by the UE 1, 2 user, in a method described below:

The UE 1, 2 can at any time initiate a USSD request to the CS-network 11. When the A-party or B-party of the UE 1, 2 or an application running in the UE 1, 2 makes a request for an address retrieval, wherein the UE 1, 2 determines to make use of the USSD mechanism, the UE 1, 2 sets up a transaction to the CS-network 11, sends the request to a Mobile Switching Center (MSC) and awaits a response. When the UE 1, 2 receives a response. The UE 1, 2 displays information contained in the response to the A- or B-party or relays the information to the application running in the UE 1, 2.

When the MSC receives a USSD request containing a Home Public Land Mobile Network (HPLMN) service code, the MSC sets up a transaction to a Visitor Location Register (VLR) and forwards the USSD request unchanged to the VLR. When a VLR receives the USSD request containing the HPLMN service code and the UE 1, 2 is not in the HPLMN, the VLR sets up a transaction to the HLR and forwards the USSD request unchanged.

When the MSC receives a USSD request containing a local service code, the MSC and the VLR process the USSD request locally. When the USSD request is relayed to the HLR, the MSC and the VLR are transparent to any further USSD requests or responses (in either direction) for that transaction, passing them between the MS and HLR without taking any action. When one transaction is released (MS-MSC/VLR or MSC/VLR-HLR), the MSC/VLR shall release the other transaction as well.

If the MSC or the VLR does not support an alphabet used in the USSD request, it shall set up a transaction to the VLR or HLR respectively and forward the USSD request unchanged, in the same way as when the HPLMN service code is received.

According 3GPP TS 23.090, the HLR forwards the USSD request, or process the USSD request locally. The location, nature and contents of the USSD application(s) is, by definition, service provider and network operator dependent, but generally includes;

setting up or releasing signalling and/or speech channels;
passing the USSD request to another network entity (unchanged or changed);
passing a different USSD request to another network entity; and/or
requesting further information from the UE 1, 2 (one or more times).

Upon completion of handling the USSD request, the network entity shall respond to the USSD request and shall release the transaction.

The USSD-aided address retrieval of a PS-identifier is implemented in either of two ways.

A-party's UE 2 sends USSD request to B-party's UE 1.
A-party's UE 2 sends a USSD request to a network service.

At the first way of retrieving the PS identifier of the B-party's UE 1, the A-party's UE 2 sends the USSD request, via the CS-network directed to the B-party's UE 1, requesting PS-domain identifier(s) of the B-party's UE 1. In this first way, the A-party's UE 2 composes a USSD request inquiring about the Internet Protocol (IP) address of B-party's UE 1. If the A-party's UE 2 is in a Visited Public Land Mobile Network (VPLMN), the USSD request is received by the VLR and is sent to the HLR of the A-party in the HPLMN of the A-party. Upon analysis of the service code in the USSD request, it is detected that the PS-domain identifier(s) of the B-party's UE 1 is requested. The HLR initiates a second USSD request to the B-party's UE 1. This second USSD request towards the B-party's UE 1 may pass through the HLR of the B-party. An application in the B-party's UE 1 decodes the USSD request, and sends the requested PS-domain identifier(s) of the PS-terminal part of the B-party's UE 1 back to the A-party's UE 2. The response from the B-party may pass through the HLR of the B-party and the HLR of the A-party When the B-party's UE 1 replies with a Session Initiation Protocol (SIP) Unified Resource Identifier URI, the A-party's UE 2 subsequently sends a "SIP OPTIONS" message to B-party's UE 1, using the B-party's SIP URI, and inquires for the terminal capabilities of B-party's UE 1. In accordance with the terminal capabilities of B-party's UE 1, certain icons may be highlighted on the graphical interface of A-party's UE 2. The A-party's UE 2 sends pictures to the B-party's UE 1 if picture messaging gets enabled, based on the retrieved information on B-party's UE 1 terminal capabilities.

This first way of USSD-aided address retrieval requires that there are terminal applications loaded and running at the A-party's UE 2 and B-party's UE 1 that are able to send and process USSD queries and generate USSD responses. These applications, e.g. embedded in the A-party's UE 2 and in the B-party's UE 1 are proprietary or standardized; the latter is preferred to avoid interoperability problems.

It is an option that the B-party's UE 1 sends an acknowledgement using USSD signaling via the CS-network 11 and uses an entirely different protocol to send the PS-domain identifiers. Another option is that the incoming USSD request received at the B-party's UE 1, carries the IP-address of the A-party's UE 2 and thus the B-party's UE 1 directly uses this PS-domain network address information for further communication.

At the second way of this USSD-aided address retrieval the A-party's UE 2 sends a USSD message directed to a network based service. The service, implemented as a lookup database server 34 or a proxy server 35, returns a USSD response towards the A-party's UE 2. The difference with the first USSD-aided address retrieval way, presented above, is that instead of relaying the USSD message to the B-party's UE 1, the HLR sends a response to the A-party. Via the HLR, which may use Any Time Interrogation (ATI) [3GPP TS 23.078 v6.1.0 ch.11.3.3.1.2] to obtain information from the VLR or a Serving GPRS Support Node (SGSN) [3GPP TS 23.078 v6.1.0 ch.11.3.6.1.2] the "state" of a subscriber is made available, whereby the subscriber (here the B-party) is identified in the USSD request to HLR either by the International Mobile Subscriber Identity (IMSI) or the Mobile Station Integrated Services Digital Network (MSISDN) number. In particular, information is obtained about the "PS-Domain Subscriber State" and "Packet Data Protocol (PDP) Context Information List" of a subscriber. This list also contains the IP-address of the subscriber, in this case the IP-address of the B-party's UE 1, connected to the PS-network 12, 13.

Depending on the requested PS-domain identifier, the HLR contact other network entities 21, 22, 31, 32, 33, 34, 35 that maintain appropriate databases (e.g. presence servers). Network nodes 21, 22, 32, 33, are arranged to retrieve the network address of UE 1, 2. The nodes 21 and 22 are comprised inside the network 11, 12, and the nodes 32, 33 are located external to the networks 11, 12, 13. Network node 31 is an E.164 number server [ENUM Network Working Group Request for Comments: 3761], network node is a lookup database server 34 and network node 35 is a proxy server 35. The network nodes 21, 22, 31, 32, 33, 34, 35 are attached to the networks 11, 12, 13 by means of associated connections 21A, 22A, 31A, 32A, 33A, 33B, 34A, 34B, 35A, 35B, 35C.

Also in this second way of USSD-aided address retrieval, the response is either based on CS-domain USSD signalling or uses another protocol to deliver the response.

Both these presented CS-domain based USSD-aided address retrieval ways are identical from A-party's UE 2 viewpoint, however they differ from the viewpoint of B-party's UE 1. These two CS-domain ways also differ from the network's viewpoint because in the first USSD-aided address retrieval way, the network is only relaying USSD messages while in the second USSD-aided address retrieval way, the service is implemented a network node as the lookup database server 34 or the proxy server 35, that intercepts the USSD message, processes it and takes actions. Radio resources of an access network (GSM/UMTS) towards the B-party's UE 1 are not used up in the second way, which is regarded as an advantage.

Ad B)

At the PS-domain based address retrieval method, the A-party's UE 2 deploys PS-domain methods via the PS-network, for example by means of SIP messages, towards an entity in the network such as the network nodes 21, 22, 31, 32, 33, 34, 35 that maintain appropriate databases (e.g. presence servers, lookup servers, proxy servers) as to retrieve the PS-domain address(es) of the B-party's UE 1.

Since the A-party's UE 2 does not have the B-party's PS-domain address (neither IP nor SIP URI), the B-party's UE 1 cannot be contacted directly by the A-party's UE 2. Information regarding the B-party's UE 1, which is currently in an ongoing CS-call with the A-party's UE 2, comprises the CS-domain network address, which is available to A-party's UE 2.

This CS-domain network address may be, among others, a telephone number of the called B-party's UE 1, MSISDN or IMSI.

The A-party's UE 2 queries a network service where the A-party's UE 2 provides the network service with the telephone number (or IMSI, MSISDN) of the B-party's UE 1. This service is implemented using an E.164 number server 31 [ENUM Network Working Group Request for Comments: 3761].

Both the CS-domain and PS-domain based address retrieval methods described above, are carried out in the background without the intervention of the user of the UE 1, 2. By deploying the invention the A-party's UE 2 presents, depending on the graphical terminal capabilities of the A-party's UE 2, an icon to appear on his/her GUI a few seconds after the set up of the CS-call.

With the implementation of this invention, either the A-party's UE 2 or the B-party's UE 1 initiates during an ongoing CS-call, a USSD mechanism as to query the other party's UE 1, 2 or the network nodes 21, 22, 31, 32, 33, 34, 35 in order to obtain the PS-domain address (e.g. IP address) of the UE 1, 2 of the other party.

The present invention provides an efficient and inventive method for retrieving the PS-domain address and the terminal capabilities of the UE of the other party. An indication at the user's UE 1, 2 might be provided, indicating the other user's UE 1, 2 terminal capabilities.

What is claimed is:

1. A method in a second User Equipment for retrieving a network address and a terminal capability of a first User Equipment, within a telecommunication system comprising two or more networks where the networks include a Circuit Switched (CS) network and a Packet Switched (PS) network, the method comprising the steps of:

establishing a first communication session with the first User Equipment over the CS network, wherein the first and the second User Equipments are connected to the CS network;

performing the following while the first communication session is in progress:

sending via the PS network, a request for retrieval of a PS network address of the first User Equipment, wherein the request for retrieval of the PS network address includes a CS network address of the first User Equipment, and wherein the request for retrieval of the PS network address is directly sent from the second User Equipment to a presence server in the PS network using a Session Initiation Protocol (SIP) message, receiving a first reply from the presence server comprising information regarding the requested PS network address of the first User Equipment, wherein the first reply contains a SIP Uniform Resource Indicator (URI) of the first User Equipment as the requested PS network address, sending via the PS network, a request for retrieval of the terminal capability of the first User Equipment in the PS network, wherein the request for retrieval of the terminal capability is a SIP message that is directly sent from the second User Equipment to the first User Equipment using the SIP URI of the first User Equipment, receiving a second reply comprising information regarding the requested terminal capability of the first User Equipment in the PS network, and indicating, on the second User Equipment, the terminal capability of the first User Equipment in the PS network;

establishing a second communication session with the first User Equipment over the PS network; and maintaining the first and the second communication sessions simultaneously.

2. The method according to claim 1, wherein the first or the second User Equipment comprises a terminal that is one of:
   a Dual Transfer Mode (DTM) terminal,
   a Global System for Mobile communications—General Packet Radio System (GSM-GPRS) terminal, and
   a Universal Mobile Telecommunication System Multi Radio Access Bearer (UMTS Multi-RAB) terminal.

3. The method according to claim 1, wherein the first or the second User Equipment is connected to two or more of the networks and comprises two or more terminals, where each of the terminals has at least one connection to each connected network, and where each of said connections has a network address.

4. The method according to claim 3, wherein the terminals deploy a communication session including at least one of speech, audio, video, e-mail, text-messages, or data.

5. The method according claim 3, wherein each of the terminals has a wire-line connection to the two or more networks or a wireless connection to the two or more networks.

6. The method according to claim 1, wherein the CS network address is one of:
- a Mobile Station Integrated Services Digital Network (MSISDN) number,
- a Public Switched Telecommunications Network (PSTN) number,
- a Virtual Private Network (VPN) private number, and
- a number according to an E.164 International Telecommunication Union (ITU) recommendation.

7. A second User Equipment for operating in a telecommunication system, the second User Equipment configured to retrieve a network address and a terminal capability of a first User Equipment, the system comprising two or more networks, where the networks include a Circuit Switched (CS) network and a Packet Switched (PS) network, the second User Equipment comprising:
- a CS network interface configured to connect the second User Equipment with the CS network with which the first User Equipment is also connected;
- a PS network interface configured to connect the second User Equipment with the PS network; and
- a processing unit and memory means containing instructions that, when executed by the processing unit, cause the second User Equipment to:
- establish a first communication session with the first User Equipment over the CS network via the CS network interface;
- perform the following while the first communication session is in progress:
  - send via the PS network, a request for retrieval of a PS network address of the first User Equipment, wherein the request for retrieval of the PS network address includes a CS network address of the first User Equipment, and wherein the request for retrieval of the PS network address is directly sent from the second User Equipment to a presence server in the PS network using a Session Initiation Protocol (SIP) message,
  - receive a first reply from the presence server comprising information regarding the requested PS network address of the first User Equipment, wherein the first reply contains a SIP Uniform Resource Indicator (URI) of the first User Equipment as the requested PS network address,
  - send via the PS network, a request for retrieval of the terminal capability of the first User Equipment in the PS network, wherein the request for retrieval of the terminal capability is a SIP message that is directly sent from the second User Equipment to the first User Equipment using the SIP URI of the first User Equipment,
  - receive a second reply comprising information regarding the requested terminal capability of the first User Equipment in the PS network, and
  - indicate, at the second User Equipment, the terminal capability of the first User Equipment in the PS network;
- establish a second communication session with the first User Equipment over the PS network; and
- maintain the first and the second communication sessions simultaneously.

8. The second User Equipment according to claim 7, wherein the second User Equipment comprises a terminal that is one of:
- a Dual Transfer Mode (DTM) terminal,
- a Global System for Mobile communications—General Packet Radio System (GSM-GPRS) terminal, and
- a Universal Mobile Telecommunication System Multi Radio Access Bearer (UMTS Multi-RAB) terminal.

9. The second User Equipment according to claim 8, wherein the terminal is configured to deploy a communication session including at least one of speech, audio, video, e-mail, text-messages, or data.

10. The second User Equipment according to claim 8, wherein the terminal has a wire-line connection to the two or more networks or a wireless connection to the two or more networks.

11. The second User Equipment according to claim 7, wherein the second User Equipment is connected to two or more of the networks and comprises two or more terminals, where each of the terminals has at least one connection to each connected network, and where each of said connections has a network address.

12. The second User Equipment according to claim 7, wherein the CS network address is one of:
- a Mobile Station Integrated Services Digital Network (MSISDN) number,
- a Public Switched Telecommunications Network (PSTN) number,
- a Virtual Private Network (VPN) private number, and
- a number according to an E.164 International Telecommunication Union (ITU) recommendation.

* * * * *

UNITED STATES PATENT AND TRADEMARK OFFICE
CERTIFICATE OF CORRECTION

| | | |
|---|---|---|
| PATENT NO. | : 9,203,970 B2 | Page 1 of 1 |
| APPLICATION NO. | : 11/572984 | |
| DATED | : December 1, 2015 | |
| INVENTOR(S) | : den Hartog et al. | |

It is certified that error appears in the above-identified patent and that said Letters Patent is hereby corrected as shown below:

On the title page, item (75), under "Inventors", in Column 1, Line 1, delete "Ijssel" and insert -- IJssel --, therefor.

In the specification,

In Column 1, Line 6, delete "60/592,491," and insert -- 60/592,427, --, therefor.

In Column 2, Line 24, delete "service'" and insert -- service --, therefor.

In Column 3, Line 47, delete "(SIPs," and insert -- [SIPs, --, therefor.

In Column 3, Line 62, delete "method" and insert -- method. --, therefor.

In Column 3, Line 64, delete "method" and insert -- method. --, therefor.

In Column 4, Line 22, delete "drawings." and insert -- drawing. --, therefor.

In Column 4, Line 23, delete "DRAWINGS" and insert -- DRAWING --, therefor.

In Column 6, Line 30, delete "party" and insert -- party. --, therefor.

Signed and Sealed this
Twenty-eighth Day of June, 2016

Michelle K. Lee
*Director of the United States Patent and Trademark Office*